United States Patent Office 2,952,645
Patented Sept. 13, 1960

2,952,645

COMPOSITION COMPRISING VINYL CARBAZOLE, INORGANIC PEROXIDE, SUBSTITUTED BORAZOLE, CELLULOSE NITRATE AND AMINOPLAST RESIN

Stephen J. Groszos, Cincinnati, Ohio, and Stanley F. Stafiej, Stamford, Conn., assignors to American Cyanamid Company, New York, N.Y., a corporation of Maine No Drawing. Original application Mar. 25, 1957, Ser. No. 647,938. Divided and this application June 24, 1958, Ser. No. 744,077

10 Claims. (Cl. 260—15)

This invention relates to certain new and useful moldable and molded compositions, and more particularly to such compositions comprising vinyl carbazole, an inorganic peroxide, a substituted borazole, cellulose nitrate and an aminoplast resin.

The substituted borazoles used in practicing this invention are B-trimethyl-N-triphenylborazole and B-triphenyl-N-trimethylborazole. B-trimethyl-N-triphenylborazole (B,B',B'' - trimethyl - N,N',N'' - triphenylborazole) has the formula (I)
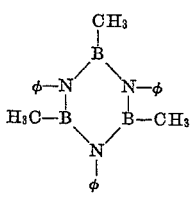

B-triphenyl-N-trimethylborazole (B,B',B''-triphenyl-N,N',N''-trimethylborazole) has the formula (II)
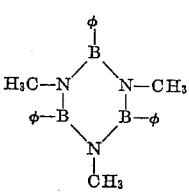

In the above formulas, as well as elsewhere herein, the symbol $\phi$ means $C_6H_5$.

The substituted borazoles employed in practicing this invention are unique in that they contain no carbon-to-carbon bond in an aliphatic chain, and hence constitute substituted borazoles which are characterized by improved stability to heat and oxidation as compared with similar borazoles containing a higher number of carbon atoms in alkyl substituents. As will be readily appreciated by those skilled in the art, this is a matter of considerable practical importance in many applications or uses of chemical compounds including boron compounds such as the borazoles.

B-trimethyl-N-triphenylborazole and B-triphenyl-N-trimethylborazole are normally solids. They are useful, for instance, as components of flame-resisting compositions; as plasticizers; as fuel additives; as scintillation counters; as the active ingredient in insecticides, bactericides, germicides, fungicides, pesticides and the like; as a chemical intermediate for use in the preparation of other compounds; as a component of arc-extinguishing tubes, and especially of surfaces that are exposed to the action of the arc. Other uses include: as rocket fuels or as components of such fuels; as polymer additives to impart neutron-absorbing properties to the polymer to which it is added and to improve the thermal stability of the polymer; as heat-exchange media or as modifiers of such media whereby they can be used at higher temperatures; as petroleum additives which are hydrolytically stable (e.g., viscosity-index improvers, lubricants and greases for high-temperature applications, cetane improvers, ignition promoters, anti-knock agents, preventives of pre-ignition, etc.); and in making new types of dyes and pigments.

In any of the aforementioned and other applications or uses, one can employ B-trimethyl-N-triphenyl-borazole alone or B-triphenyl-N-trimethylborazole alone or a mixture of B-trimethyl-N-triphenylborazole and B-triphenyl-N-trimethylborazole in any proportions. They can be used in conjunction with any of the conventional components of flame-resisting compositions, plasticizers, insecticides, bactericides, germicides, fungicides, pesticides, and other compositions hereinbefore mentioned by way of illustrating the fields of utility, generically and specifically, of the substituted borazoles of this invention.

The compounds of this invention can be prepared by various methods, including those which are broadly and specifically disclosed and claimed in our copending applications, Serial No. 647,934, now U.S. Patent 2,892,869, and Serial No. 647,935, filed March 25, 1957. Application Serial No. 647,934 has now matured into Patent No. 2,892,869, dated June 30, 1959.

In order that those skilled in the art may better understand how the present invention can be carried into effect, the following examples are given by way of illustration and not by way of limitation.

EXAMPLE 1

*Preparation of B-trimethyl-N-triphenylborazole using methyl lithium*

Methyl lithium is prepared from 0.05 mole of methyl iodide and 0.1 mole lithium in 100 ml. of hexane. A suspension of 0.015 mole of B-trichloro-N-triphenylborazole in 100 ml. of anhydrous ethyl ether is added to the methyl lithium solution at about 0° C. over a 20-minute period. After refluxing the reaction mixture for one hour, and then cooling, a saturated solution of ammonium chloride is added until the organic solution becomes clear. The insoluble inorganic salts are separated by filtration, and the organic solution, after drying over anhydrous magnesium sulfate, is evaporated to dryness, leaving a nearly colorless, crystalline solid comprising B-trimethyl-N-triphenylborazole. Recrystallization from an ether-methanol mixture yields colorless, crystalline material of M.P. 267°–269° C.

Instead of using B-trichloro-N-triphenylborazole as described above, one can use an equivalent amount of B-tribromo-N-triphenylborazole.

EXAMPLE 2

*Preparation of B-trimethyl-N-triphenylborazole using methyl magnesium iodide*

Methyl magnesium iodide is prepared from magnesium (3.54 g.; 0.146 g. atom) and methyl iodide (22.9 g.; 0.146 mole) in anhydrous diethyl ether (150 ml.). The resulting solution is added dropwise over a 30-minute period to a suspension of 0.0364 mole B-trichloro-N-triphenylborazole in 100 ml. ether at 0°–30° C. After refluxing the reaction mixture for 1½ hours, the cooled solution is titrated with a saturated aqueous solution of ammonium chloride to the point at which the magnesium salts separate from the clear, colorless ether layer. The ether solution is separated from the insoluble salts, which are washed several times with small quantities of fresh ether. The combined ether solution and washings are filtered through anhydrous sodium sulfate, and the dry ether solution is then concentrated until the product begins to separate from solution. After cooling to room temperature the product comprising B-trimethyl-N-triphenylborazole is collected by filtration to furnish nicely crystalline material. Concentration of the mother liquor furnishes additional quantities of the product. Total weight: 9.85 g. Yield: 77% of the theoretical.

An analytical sample recrystallized once from diethyl ether melts at 267°–269° C.

| Analysis | C | H | N | B |
|---|---|---|---|---|
| Calculated for $C_{21}H_{24}N_3B_3$, percent | 71.88 | 6.89 | 11.97 | 9.25 |
| Found, percent | 71.79 | 6.89 | 12.20 | 9.03 |

Instead of using methyl magnesium iodide as the Grignard reagent as described above, one can use an equivalent amount of methyl magnesium chloride.

EXAMPLE 3

A. *Preparation of B-trichloro-N-trimethylborazole*

A glass tube (1¼" O.D., about 2.5 ft. long), provided with a thermocouple and an inlet for simultaneous introduction of $BCl_3$ and an inert gas (helium or nitrogen) whose flow rates are measured by flowmeters, is packed at the inlet end with an intimate mixture of 15 g. of methylamine hydrochloride and asbestos previously dried for about 16 hours in an oven at 110° C. The exit end of the tube is attached in series to a Dry-Ice trap and a bubble counter. After the reactor zone has been heated to approximately 190° C., helium and boron trichloride are introduced simultaneously. After 1.5 hours the $CH_3NH_2.HCl$ on the asbestos appears "wet," indicating that a reaction is taking place. After two hours, a white crystalline solid begins to sublime to the cooler portion of the tube. The flow of $BCl_3$ is discontinued after 4.5 hours, and the crystalline solid is caused to sublime to the exit end of the tube by maintaining the flow of helium and moving the furnace along the tube. At the end of this operation, the asbestos still contains, admixed with it, a considerable amount of solid. The re-heating and re-sublimation process in a stream of helium is continued until no more crystalline material remains in the reactor zone. During this process, which requires five hours, HCl is being evolved. Elementary analysis of the product indicates the following composition: C, 14.32; H, 4.09; N, 16.31; Cl, 57.69; analysis calculated for a mixture of 60% B-trichloro-N-trimethylborazole, $(ClB=NCH_3)_3$, and 40% $CH_3NH—BCl_2$: C, 13.87; H, 3.80; N, 16.17; Cl, 53.82. Similarly, with the exception of analysis for chlorine, the analytical figures are in good agreement for a mixture of 70% B-trichloro-N-trimethylborazole and 30% $CH_3NH—BCl_2$. Reheating this material at about 285° C. in a stream of nitrogen leaves a residue, the analytical values of which are in fair agreement with those calculated for the desired product, B-trichloro-N-trimethylborazole.

| Analysis | C | H | N |
|---|---|---|---|
| Calculated for $C_3H_9N_3Cl_3B_3$, percent | 15.95 | 4.02 | 18.60 |
| Found, percent | 15.73 | 4.90 | 18.79 |

In subsequent runs using a charge of 30 g. of $CH_3NH_2.HCl$ there is obtained 23 g. of this mixture. Assuming 70% of this mixture is the desired product, this represents a 50% yield. Without further purification, the mixture obtained from the hot-tube reaction is used for subsequent reaction, for instance as described under B of this example.

B. *Preparation of B-triphenyl-N-trimethylborazole*

The Grignard reagent, phenyl magnesium bromide, is prepared from 4.93 g. (0.2 mole) of magnesium turnings and 31.5 g. (0.2 mole) of bromobenzene in 200 ml. of anhydrous ether. A suspension of 5.0 g. of crude B-trichloro-N-trimethylborazole (obtained as described under A) in 60 ml. of anhydrous diethyl ether is added with stirring at room temperature over a 15-minute period to the Grignard solution. Heat is evolved, and gradually a finely divided crystalline solid separates from the reaction mixture. Stirring is continued at room temperature for 30 minutes longer, and then the mixture is refluxed for about 16 hours. (The amount of solid appears to increase after the first 10 minutes of refluxing.) After cooling the reaction mass to room temperature and allowing the solids to settle, the supernatant liquid is removed by filtering through a filter stick to another flask by means of positive $N_2$ pressure and reduced pressure. The crystalline residue is washed with fresh portions of dry diethyl ether, and the washings are removed in the same manner as was the original supernatant layer. The crystalline material is finally collected by suspending it in a small amount of ether and filtering rapidly in the conventional manner. After drying in a vacuum desiccator, 5.1 g. of crude product comprising B-triphenyl-N-trimethylborazole is obtained; M.P. 277°–281° C. (dec.). Recrystallization from benzene-hexane furnishes 2.92 g. of product, M.P. 270° C. (dec.), and a second crop of 0.74 g., M.P. 270° C. (dec.). Yield: 69% of the theoretical. The analytical sample, obtained from benzene-hexane, has a melting point of 270° C. (dec.).

| Analysis | C | H | N | B |
|---|---|---|---|---|
| Calculated for $C_{21}H_{24}N_3B_3$, percent | 71.88 | 6.89 | 11.97 | 9.25 |
| Found, percent | 71.86 | 6.87 | 11.54 | 8.81 |

The original ether solution and washings from which the B-triphenyl-N-trimethylborazole is isolated, are treated with a 10% aqueous HCl solution to decompose any unreacted Grignard reagent and/or complexes thereof. The ether layer is washed with water and then extracted with three 25-ml. portions of 10% aqueous NaOH solution. The basic aqueous layer is acidified with 10% aqueous $H_2SO_4$ solution. The resulting milky solution containing an immiscible, viscous, brown oil is extracted with ether, and the ether layer is washed with water until neutral to litmus. Without drying, the ether soluion is evaporated to a brown, semi-solid mass which is recrystallized from water (after prior treatment with decolorizing carbon), giving 1.06 g. of phenylboronic acid.

The ether layer that remains after extraction with base (10% aqueous NaOH solution) to remove phenylboronic acid is washed with 10% aqueous HCl solution and with water until neutral to litmus. After drying over anhydrous $Na_2SO_4$, the yellow ether solution is evaporated to a reddish, mobile liquid that gives only a weak flame test for boron. A solution of this residue in benzene containing ethanolamine is refluxed for 12 hours. From this reaction no aminoethyl diphenylborinite is isolated.

EXAMPLE 4

*Preparation of B-triphenyl-N-trimethylborazole by reaction between phenylboron dichloride and methylamine*

This example illustrates another method of preparing B-triphenyl-N-trimethylborazole. The reaction is illustrated by the following equation:

(III)

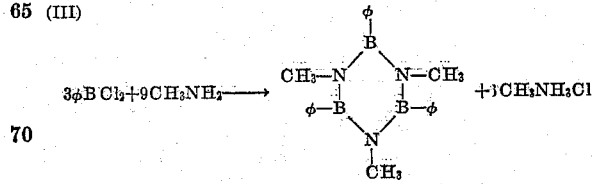

Four and three-tenths (4.3) g. (0.0271 mole) $\phi BCl_2$ is dissolved in 50 ml. of dry benzene and charged to a three-necked flask. The flask is fitted with a mechanical stirrer, nitrogen and methylamine gas-inlet tubes, and a drying tube filled with potassium hydroxide.

Dry methylamine is introduced slowly to the reaction mixture at 0°–20° C. over a period of two hours. The mixture is heated to boiling and gravity-filtered to remove the $CH_3NH_3Cl$ formed in the reaction. The $CH_3NH_3Cl$ is washed with three 10-ml. portions of hot benzene and the washings added to the filtrate.

The light-amber filtrate is concentrated to about 30 ml. and n-hexane added until the solution becomes slightly turbid. Upon cooling, this solution fails to yield crystals. Upon seeding, however, a precipitate of fine white needles is obtained. Yield: 2.6 grams, which corresponds to 84% of the theoretical. The melting point of these crystals upon recrystallization is 267°–268° C.

The compound is identified by infra-red as B-triphenyl-N-trimethylborazole.

The method described in this example with reference to the preparation of B-triphenyl-N-trimethylborazole is operative in making other B-triphenyl-N-tri-(organo)-borazoles, more particularly B-triphenyl-N-tri-(hydrocarbon)borazoles. For instance, B-triphenyl-N-triphenylborazole is similarly made by effecting reaction between phenylboron dichloride and aniline in the ratio of 3 moles of the former to 9 moles of the latter. The aniline dissolved in, for example, dry benzene, is added to the stirred solution of phenylboron dichloride in dry benzene at 0°–30° C., and the B-triphenyl-N-triphenylborazole that forms is isolated from the reaction mass.

EXAMPLE 5

This example illustrates the use of the aforementioned substituted borazoles in making the compositions of the present invention. More particularly, it shows the preparation of a composition that can be employed in making an insulating structure, especially adapted for use in certain types of electric-circuit interrupters, which structure is disposed adjacent and in confining relationship to an arc formed upon opening the circuit.

A vinyl compound represented by the general formula

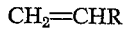

$$CH_2=CHR$$

wherein R represents a condensed cyclic system with nitrogen united to the nucleus, and specifically fibrous vinyl carbazole, is ground (without destroying its fibrous structure) with from about 1% to 10% (specifically about 5%) by weight thereof of a substance capable of emitting oxygen in the heat of the arc. Examples of such oxygen-emitting substances which are suitable for use are inorganic peroxides, e.g., peroxides of magnesium, barium, calcium and the like. There is also ground with the fibrous vinyl carbazole from about 5% to 15% (specifically about 7.5%) by weight thereof of B-triphenyl-N-trimethylborazole, and about 5% to 15% (specifically about 7.5%) by weight thereof of an organic compound containing nitrogen and capable of evolving an arc-extinguishing gas or gases with an explosive effect under the heat of the arc. An example of such an organic compound is cellulose nitrate having a low nitrogen content (about 10.5% to 11.5%), which material also is known as pyroxylin.

A sufficient amount of an aminoplast, e.g., a urea-formaldehyde resin, a melamine-formaldehyde resin, a urea-melamine-formaldehyde resin, etc., is incorporated into the mass to form a composition adapted to be shaped, for instance by molding, extrusion or other suitable means. The aminoplast may constitute, for instance, between about 40% and about 75% by weight of the composition. The molding or extruding temperatures are kept as low as possible in order to prevent decomposition of the explosive material.

In the above-described composition the fibrous vinyl carbazole serves as a rigid carrier of the organic nitrogen-containing compound that is capable of evolving an arc-extinguishing gas with an explosive effect under the heat of the arc and by which cellulose nitrate specifically is meant. The B-triphenyl-N-trimethyl-borazole serves to modify and to control the explosive effect of the said organic compound while at the same time emitting arc-extinguishing gases; the aminoplast acts as a binding agent; and the oxygen-emitting substance provides oxygen for oxidizing into carbon dioxide any carbon that may be formed during the gasifying process.

Instead of B-triphenyl-N-trimethylborazole in the composition described above, one can use B-trimethyl-N-triphenylborazole, or a mixture of B-triphenyl-N-trimethylborazole and B-trimethyl-N-triphenylborazole in any proportions.

This application is a division of our copending application Serial No. 647,938, filed March 25, 1957, now abandoned in favor of our copending application Serial No. 748,822, filed July 16, 1958, as a continuation-in-part of said application Serial No. 647,938.

We claim:

1. A moldable composition comprising (1) fibrous vinyl carbazole, said vinyl carbazole being adapted to serve as a rigid carrier of an organic nitrogen-containing compound that is capable of evolving an arc-extinguishing gas with an explosive effect under the heat of an arc formed upon opening the circuit of an electric-circuit interrupter; (2) from about 1% to about 10%, by weight of said carbazole, of an inorganic peroxide selected from the group consisting of the peroxides of magnesium, barium and calcium; (3) from about 5% to about 15%, by weight of said carbazole, of a substituted borazole selected from the class consisting of B-trimethyl-N-triphenylborazole, B-triphenyl-N-trimethyl-borazole, and mixtures thereof; (4) from about 5% to about 15%, by weight of said carbazole, of cellulose nitrate having a nitrogen content of about 10.5% to 11.5%, said cellulose nitrate being capable of evolving an arc-extinguishing, gaseous material with an explosive effect under the heat of the aforesaid arc; and (5) an aminoplast resin in an amount corresponding to from about 40% to about 75% by weight of the moldable composition, said aminoplast resin being selected from the class consisting of urea-formaldehyde resins, melamine-formaldehyde resins and urea-melamine-formaldehyde resins.

2. A moldable composition as in claim 1 wherein the substituted borazole of (3) is B-trimethyl-N-triphenylborazole.

3. A moldable composition as in claim 1 wherein the substituted borazole of (3) is B-triphenyl-N-trimethylborazole.

4. A moldable composition as in claim 1 wherein the substituted borazole of (3) is a mixture of B-trimethyl-N-triphenylborazole and B-triphenyl-N-trimethylborazole.

5. A moldable composition as in claim 1 wherein the inorganic peroxide of (2) constitutes about 5% by weight of the fibrous vinyl carbazole of (1).

6. A moldable composition as in claim 1 wherein the substituted borazole of (3) constitutes about 7.5% by weight of the fibrous vinyl carbazole of (1).

7. A moldable composition as in claim 1 wherein the cellulose nitrate of (4) constitutes about 7.5% by weight of the fibrous vinyl carbazole of (1).

8. A product comprising the molded composition of claim 1.

9. A moldable composition comprising (1) fibrous vinyl carbazole; (2) from about 1% to 10%, by weight of the said carbazole, of an inorganic peroxide selected from the class consisting of magnesium peroxide, barium peroxide and calcium peroxide; (3) from about 5% to 15%, by weight of the said carbazole, of B-triphenyl-N-trimethylborazole; (4) from about 5% to 15%, by weight of the said carbazole, of cellulose nitrate having a nitrogen content of from about 10.5% to 11.5%; and (5) an aminoplast resin in an amount corresponding to from about 40% to about 75% by weight of the moldable composition, said aminoplast resin being selected from the class consisting of urea-formaldehyde resins, melamine-formaldehyde resins and urea-melamine-formaldehyde resins.

10. A product comprising the molded composition of claim 9.

References Cited in the file of this patent

UNITED STATES PATENTS

| | | |
|---|---|---|
| 2,367,275 | Haney et al. | Jan. 16, 1945 |
| 2,821,463 | Scott et al. | Jan. 28, 1958 |

OTHER REFERENCES

Royals: "Advanced Organic Chemistry," published by Prentice-Hall, Inc., March 1954, page 533.

UNITED STATES PATENT OFFICE

CERTIFICATE OF CORRECTION

Patent No. 2,952,645            September 13, 1960

Stephen J. Groszos et al.

It is hereby certified that error appears in the printed specification of the above numbered patent requiring correction and that the said Letters Patent should read as corrected below.

Column 2, line 22, strike out "now U.S. Patent 2,892,869,"; column 3, second table, under the heading "n", last line, for "18.79" read -- 17.79 --; column 4, line 44, for "soluion" read -- solution --; same column 4, formula III, the right-hand portion should read as shown below instead of as in the patent:

$$+6CH_3NH_3Cl$$

Signed and sealed this 4th day of April 1961.

(SEAL)
Attest:    ERNEST W. SWIDER

Attesting Officer

ARTHUR W. CROCKER
Acting Commissioner of Patents